(12) United States Patent
Dahl et al.

(10) Patent No.: US 6,540,495 B2
(45) Date of Patent: Apr. 1, 2003

(54) AIR FLOW SYSTEMS FOR AUTOMATED PREFORM PROCESSING

(75) Inventors: Jeffrey Scott Dahl, Farmington Hills, MI (US); Norman Gerald Chavka, Allen Park, MI (US); Carl Frederick Johnson, Belleville, MI (US); Eric Daniel Kleven, Ypsilanti, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/758,890

(22) Filed: Jan. 11, 2001

(65) Prior Publication Data

US 2002/0086073 A1 Jul. 4, 2002

Related U.S. Application Data

(60) Provisional application No. 60/259,112, filed on Dec. 29, 2000.

(51) Int. Cl.$^7$ .............................................. B29C 31/08
(52) U.S. Cl. .................... 425/126.1; 425/289; 425/449; 425/DIG. 47
(58) Field of Search .......................... 425/82.1, 126.1, 425/449, 289, DIG. 47

(56) References Cited

U.S. PATENT DOCUMENTS

| | | | | |
|---|---|---|---|---|
| 4,117,067 A | | 9/1978 | Charter et al. | 264/119 |
| 4,917,902 A | * | 4/1990 | Slocum et al. | 425/406 |
| 5,178,885 A | * | 1/1993 | Vallier et al. | 249/160 |
| 5,192,387 A | * | 3/1993 | Buckley | 156/275.5 |
| 5,338,169 A | | 8/1994 | Buckley | 425/82.1 |
| 5,928,680 A | * | 7/1999 | Tadion | 425/405.1 |
| 6,338,618 B1 | * | 1/2002 | Van Ert et al. | 249/170 |

FOREIGN PATENT DOCUMENTS

FR 2 639 867 A 6/1990

* cited by examiner

Primary Examiner—Jan H. Silbaugh
Assistant Examiner—Joseph S Del Sole
(74) Attorney, Agent, or Firm—Raymond L. Coppiellie

(57) ABSTRACT

System for the manufacture of reinforcing preforms for structural composite products. The air flows for the manufacturing stations are optimized by providing a separate air system for each cell and providing seals between the net-edge blocks and the mold portions.

4 Claims, 4 Drawing Sheets

US 6,540,495 B2

AIR FLOW SYSTEMS FOR AUTOMATED PREFORM PROCESSING

CROSS-REFERENCE TO RELATED APPLICATIONS

This application claims priority from United States Provisional Patent Application Ser. No. 60/259,112 filed on Dec. 29, 2000.

TECHNICAL FIELD

The present invention relates to the manufacture of reinforcing preforms for structural composites, and more particularly to optimizing air flow in the manufacturing process and adjusting the air ejector pressure.

BACKGROUND

The present invention relates to methods and systems for making rigid three-dimensional reinforcement preforms used in resin transfer molding (RTM) and structural reaction injection molding (SRIM) processes for the manufacture of structural composites. The manufacture and use of structural composite materials is becoming increasingly important today, particularly in components for the automotive industry. Structural composites are lighter in weight than conventional steel or metal components and can result in additional advantages, such as allowing fully automated, highly controllable processes, better part-to-part consistency, reduced waste or scrap, and equivalent or increased component performance.

In general, the structural reinforcing preforms are made from a sprayed chopped material such as glass and carbon fiber, which is held together by a binder and molded into a precise form and shape. The preform in turn is then molded into products, such as composite components (both structural and non-structural) and used in automobiles or other vehicles.

The preform material is chopped and applied along with a powdered binder to a preform screen in a mold using a robotic routine. Positive air flow through the screen holds the chopped material on the screen surface. When the spraying is completed, the mold is closed and the preform is compressed to the desired thickness. Heated air is first drawn through the screen in order to melt the binder. Thereafter, cooled or ambient air is drawn through the preform setting the final shape. Once the preform is completed, it is demolded and transferred to a component mold where the structural component is molded.

Although present automated preform processes and systems have been used to produce satisfactory structural composite products, a need exists to improve the processes and systems, particularly to reduce the cost, increase the output and reliability, and make components of various configurations and thicknesses.

SUMMARY OF THE INVENTION

It is an object of the present invention to provide improved systems and processes for making rigid three-dimensional reinforcement preforms for resin transfer molding (RIM) and structural reaction injection molding (SRIM) processes for composite components and products. It is also an object of the present invention to optimize the air flow in the manufacturing process, particularly as to each cell in a multiple cell system.

It is another object of the present invention to prevent air flow during mold closure from disturbing the sprayed materials. It is a still further object of the present invention to allow adjustment of the air ejector pressure, especially to accommodate the spraying of various materials or various amounts of materials at various portions of the mold.

In accordance with these objects, the present invention provides improvements and advantages over known preform processes and systems. In particular, separate air systems are used for each cell or station in a multiple cell preform manufacturing system in order to provide the necessary air flow at each preforming cell. This provides manufacturing uniformity and consistency at each cell of a multiple cell system.

In accordance with another aspect of the present invention, seals are provided to eliminate high velocity air flow through gaps in the tooling as the mold is being closed which could otherwise disturb the sprayed materials. Seals can be provided between the net-edge block and the deposition screen as well as between the consolidation screen and the net-edge blocks.

In addition, the air pressure of the material applicators can be varied and adjusted in order to allow different materials to be processed and different characteristics to be achieved in the preforms. The air ejector pressure can be adjusted by a computer controlled pneumatic proportional valve.

DESCRIPTION OF THE PREFERRED EMBODIMENTS(S)

Figure 1:
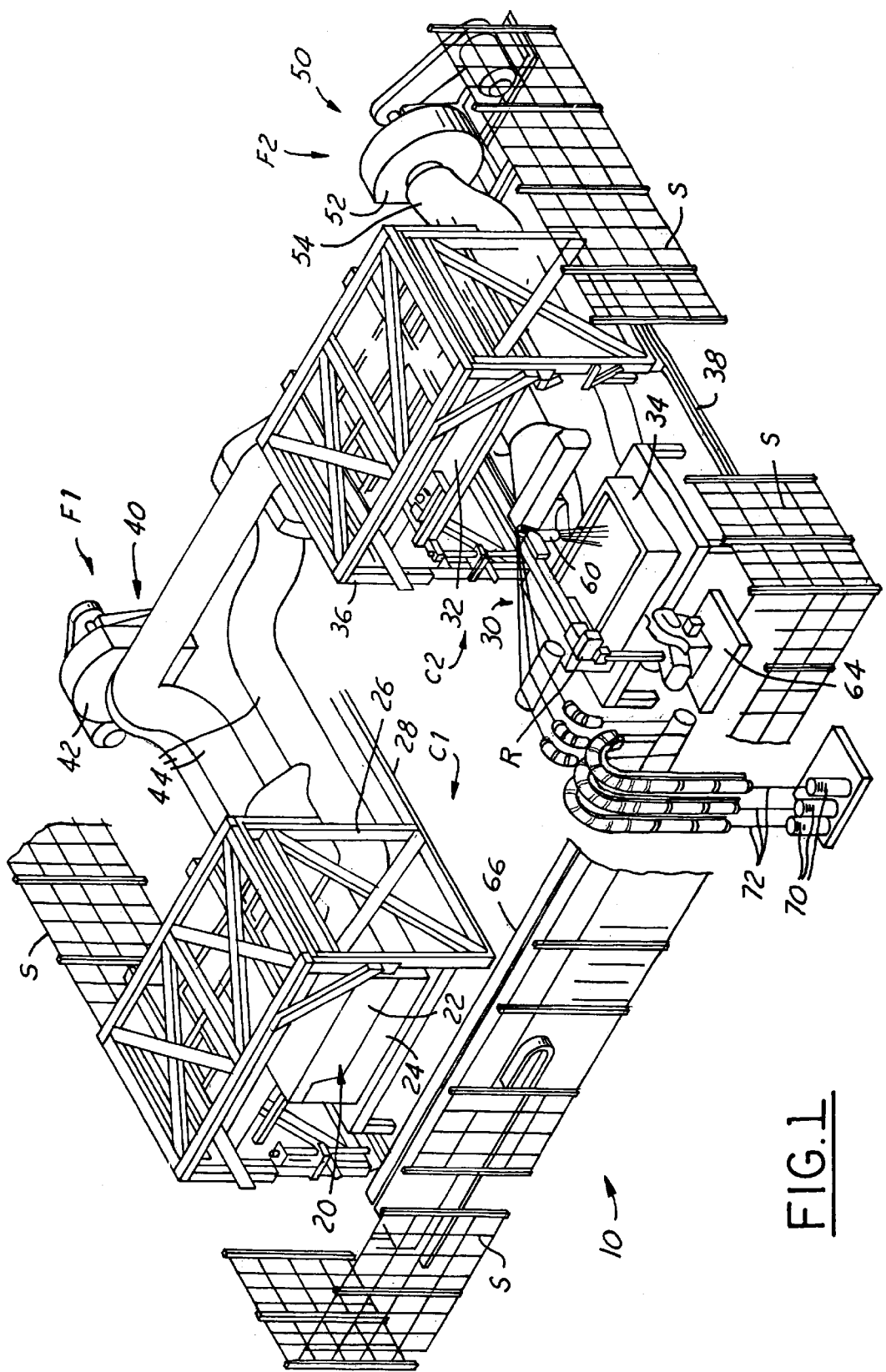
FIG. 1 is a perspective schematic drawing of a multiple cell system for manufacturing reinforcing preforms.

A system for the manufacture of a reinforcing preform is shown schematically in FIG. 1 and referred to generally by the reference numeral 10. The system 10 consists of two cells C1 and C2, each of which are utilized to make a separate preform product. The cell C1 includes a two-piece mold 20 which includes an upper mold portion 22 and a lower mold portion 24. Each of the mold portions includes a screen member provided in the precise shape of the upper or lower surface of the preform. The upper mold portion 22 is positioned on a moveable frame member 26 which is moveable along a set of tracks 28.

Similarly, the mold 30 of cell C2 includes an upper mold portion 32 and a lower mold portion 34 each of which has screen members. The upper mold portion 32 is positioned in a moveable frame member 36 which is moveable along a set of tracks 38.

Each of the cells C1 and C2 has a separate suction fan F1 and F2, respectively, for providing the requisite air flow for the preforming operation. The air system 40 for cell C1 includes a fan mechanism 42 with an appropriate motor and blade system thereon (not shown), as well as a series of conduits 44 which circulate air to and from the mold 20. Similarly, air system 50 for cell C2 includes a fan mechanism 52 together with appropriate fan motor and blades not shown), as well as a system of conduits 54 for circulation of the air flow into and through the mold 30.

The use of separate suction fans F1 and F2 for each of the cells C1 and C2 insures that the process used in each cell is the same regardless of the stage of the preform process. The use of two suction fans allow consistent air flow rates and air velocities through the preforming tools at all times during the manufacture and operation. This insures that each cell is working in the same manner regardless of the stage of component fabrication on other cells in the system. By controlling the air velocity and air flow rate separately for each cell, this also insures repeatability from part-to-part and repeatability from cell-to-cell.

A robot R is used to supply the reinforcing material to the mold to make the preforms in each of the cells C1 and C2. The robot R is an automated six-axis cartesian coordinate robot of conventional type with a "chopper gun" 60 at the end of a moveable boom or arm 62.

The robot R is positioned on a base 64 which is moveable along a track 66. The track 66 is positioned and provided to allow movement of the robot R back and forth between the two cells C1 and C2. In this manner, a single robot R can be used to make the preform in each of the molds 20 and 30 in the two-cell system 10.

An appropriate safety screen S or fencing of conventional type is typically provided around the multiple cell system 10 in order to separate it from other machinery and systems in the facility. The screening S is also utilized to prevent unauthorized or inadvertent entry into the system 10.

Figures 2, 3:
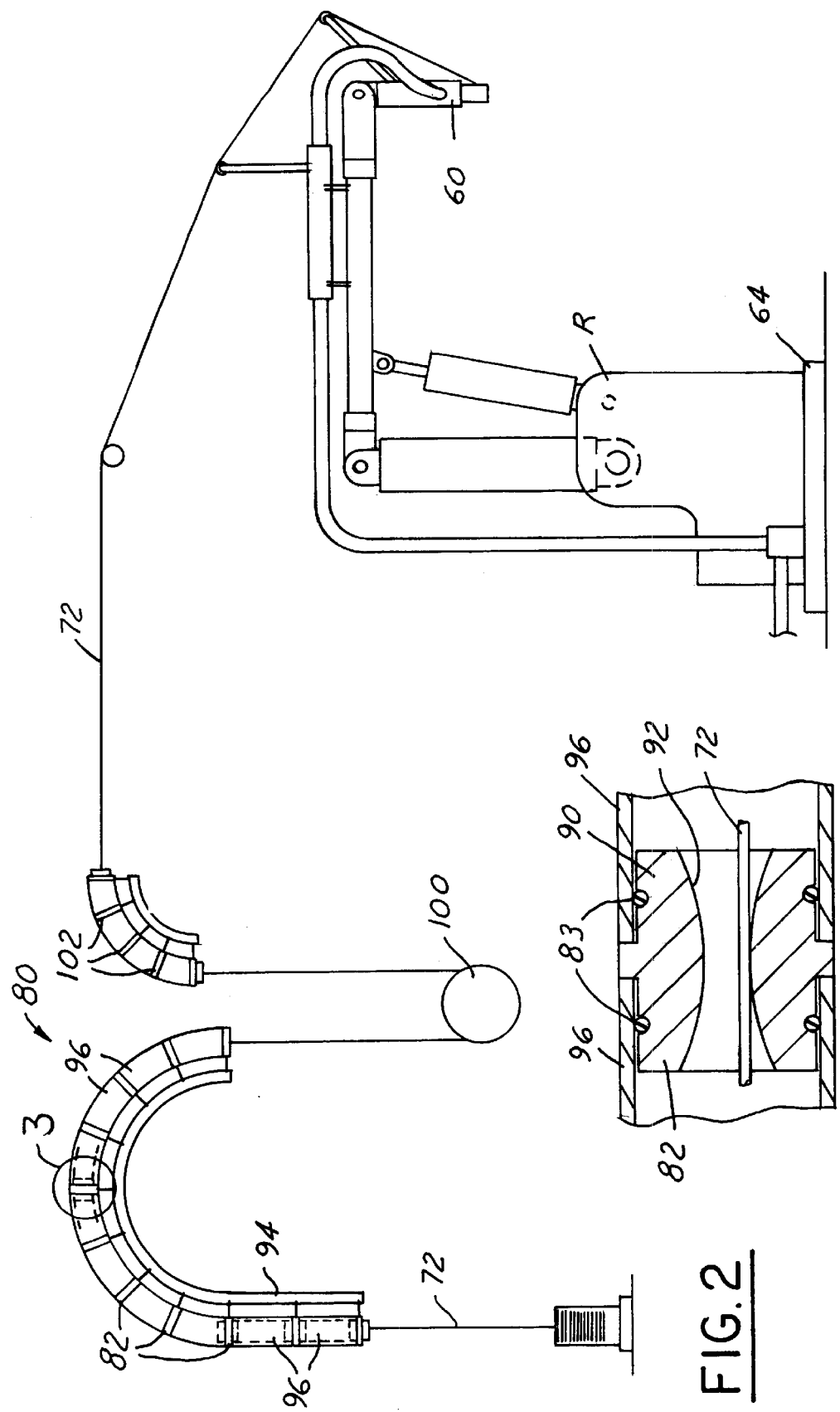
FIG. 2 is a schematic diagram of a system for reducing friction in the supply of string reinforcing materials to the applicator equipment.
FIG. 3 is an enlarged view of an eyelet used in the system for transferring string reinforcing materials to the application equipment.

A plurality of doffs or bobbins 70 of string reinforcing material, such as glass or carbon fiber roving, are utilized with the present invention. String materials 72 from the bobbins 70 are supplied to the ejector apparatus or chopper gun 60 on the robot R by a supply system 80 as shown in FIG. 2. The string reinforcing material 72 is first threaded through a series of eyelets 82 which are positioned in the manner shown in FIG. 2 to provide a 1800 curve of the material. Each of the eyelets includes a structure 90, as shown in FIG. 3, having an internal passageway 92 which allows the string material 72 to be guided therethrough with minimal contact and friction. The eyelets 90 are connected to a curved support member 94. A series of tubular members 96 are used to enclose the string materials between the individual eyelets 82.

A balance or tensioning weight 100 supplies the appropriate tension of the string material between the doff or bobbin 70 and the chopper gun 60. A second series of eyelets 102 are provided in order to guide the string material 72 from the balance or tensioning weight 100 to the arm 62 of the robot R. The eyelets 102 are the same as the eyelets 82 described above. Appropriate seals 83, such as O-rings, are used to hold the tubular members 96 in place on the eyelets 82, 102.

The tubular members 96 positioned between the eyelets are preferably made from a flexible material, such as polyvinyl chloride (PVC). The tube members retain the roving within the eyelets. The eyelets can be fabricated from a variety of materials, including ceramic, micarta, stainless steel, steel, aluminum, or the like. The eyelets are used as a contact surface during the change of direction of the glass material in order to control the material and decrease the contact surface area and friction. The tube members are of sufficient diameter so that they will not contact the string reinforcing material as it is passing from the bobbin or doff to the robot. The tube members also allow the use of air pressure to help feed the string materials through the eyelets. This eliminates the need to manually feed the material through each individual eyelet.

The present invention can be utilized with preformed materials such as glass, carbon, glass/carbon hybrids, and the like. The eyelets significantly reduce friction while allowing the string binder materials to be processed in existing chopper guns without modification of them.

In accordance with the automated preforming process in accordance with the present invention, the roving from the doffs or bobbins 70 is broken up or "chopped" by the chopper gun 60 into small pieces of material in the order of 10–50 mm in length, depending on the precise processing system utilized. The preferred applicator or chopper gun is supplied by Applicator System AB which includes two separate chopper members, a surface veil chopper and a reinforcement chopper. A pneumatic motor drives the surface veil chopper with the feed and knife rollers connected with a drive belt. If a veil layer of fine chopped material, on the order of 9–10 mm in length, is desired, a single-ended roving is utilized. This allows the fibers to defibrillate or filamentize, yielding a uniform veil mat layer. The addition of the chopped veil mat layer assists in part demolding and can be advantageous to enhance surface quality of the molded part if required.

One of the advantages of the applicator chopper device is that it has a large processing window and high output capability that significantly reduces preformed fabrication times when compared with traditional chopper guns. The chopper gun also preferably processes glass rovings of 2200 to 3500 TEX, and preferably 2400 TEX is utilized in the preform process.

The chopper gun utilizes electric servo motors to control the speed of both the feed and knife rollers, thus allowing continuously variable fiber output and fiber length during the preforming process. Fiber output and length control can be changed during the process to eliminate fiber-bridging issues and radii and to obtain net-shape edge characteristics.

Figure 7:
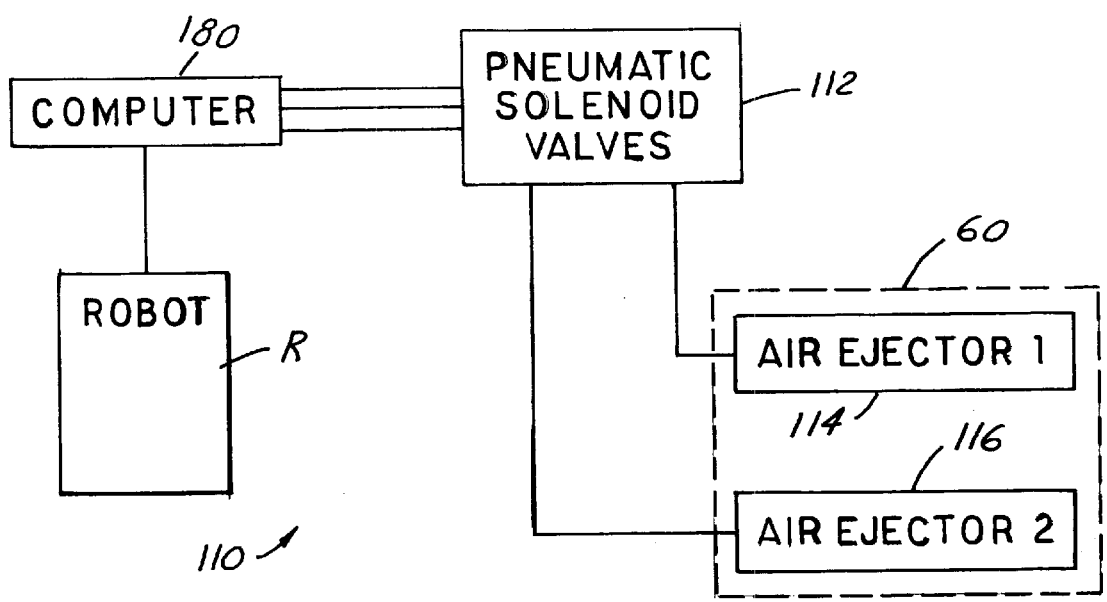
FIG. 7 is a schematic diagram of a system for varying the air flow to the ejectors.

In accordance with the present invention, a variable air pressure system 110 is utilized, as shown in FIG. 7. This allows adjustment of the air ejector input pressure which changes the output force of the chopper gun and allows different materials to be processed and different characteristics to be achieved in the sprayed preform. A conventional pneumatic proportional valve 112 is connected to the two air ejectors 114 and 116 in the chopper gun. The pneumatic proportional or solenoid valve 112 is controlled by a system computer 180 or the robot R. By allowing continuously variable air ejector pressure to be controlled in this manner, various materials not previously able to be processed in the preform system—or various unique combinations of materials—can be utilized. In addition, the preform characteristics can be enhanced, including net-shape edge definition. The input air pressure and subsequent output air flow from the ejector can be specified by the machine operator depending upon the material being processed or the desired preform characteristics.

Figure 6:
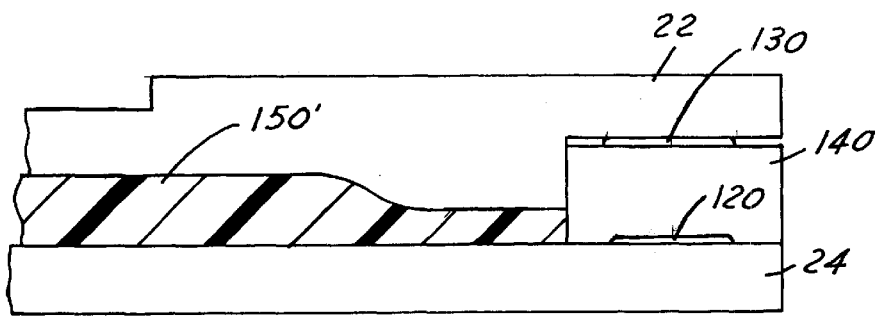
FIG. 6 illustrates the molding of a reinforcing preform with varying thickness.

In this regard, a rigid three-dimensional preform having various thicknesses of material at various portions of the preform component can be manufactured in accordance with the present invention. A representative preform product 150' in this regard is shown in FIG. 6. With this system, a "tailor-blanking" process can be utilized which allows the formation of components having the desired thickness for structural rigidity where desired, but allowing the use of thinner portions of the component where the rigidity is not necessary or required.

Any conventional roving can be utilized with the present invention, such as fiberglass roving produced by Owens-Corning. Also, the glass roving preferably has a sizing on it which improves the bonding and handling characteristics.

In order to form the preformed product, deposition screen members shaped in the form of the preform are provided in the lower mold portion 24 and 34 of the molds 20 and 30 respectively. The reinforcing roving materials such as string binders, are chopped by the chopper gun 60 and applied along with a thermal plastic or thermoset powder binder to the preformed screens using a robotic routine.

Positive air flow through the preform deposition screen members holds the chopped materials on the screen surface during the entire spray-up routine. If desired, as mentioned above, a surface veil can be applied first on the screen. A surface veil enhances the surface quality of the molded part and also can be used to prevent flow of the binder through the deposition screen and into the air circulation system.

For formation of the preform, the robot R is positioned adjacent the appropriate cell, for example C1, and used to spray the chopped glass and binder to the desired thickness on the preformed screen. When the spray-up is complete, the moveable frame member 26 with the upper mold portions 22 is automatically moved in position over the lower mold portion 24 and the tool is closed. The upper mold portion has a similar consolidation screen member which is shaped to form the finished preform. Ambient temperature air flow through the preform screen is terminated and heated air is drawn through the screens in order to melt the binder on the chopped materials and hold them together. At the same time, the mold is closed, compressing the chopped material into the desired size and configuration. After the binder has been cured or melted, the heated air flow is stopped and cooled or ambient air is drawn through the preform thereby cooling or freezing the binder and setting the final shape of the preforms. Once the mold or tool is opened, the finished preform is demolded and then utilized as a reinforcement member in the formation of a composite component or product.

With a multi-cell system 10, as shown in FIG. 1, two preforms can be manufactured with use of a single robot R. In this manner, once the chopped glass and binder are finished being applied to the screen in cell C1, and the mold is started to be closed and the preform consolidated, the robot R can be moved along track 66 to its station at cell C2 in order to spray form a second preform. In this manner, a plurality of preforms can be produced consecutively from system 10, with a preform being formed optimally every 3–4 minutes.

The present invention is a fully automated preforming process requiring little or no operator intervention. The full process automation is accomplished by the robotics and by automating machine control. The process automation provides repeatability in part-to-part consistency as required in high volume automotive applications of composites.

As indicated, either thermal plastic or thermoset binder materials can be utilized in order to manufacture the preform. The use of each of these materials is known in the art and each has its own advantages and disadvantages. For example, thermoset binding materials appear to prevent binder migration in the molded parts, but require higher temperatures and longer holding time to obtain complete cares and to eliminate binder "tackiness" in the preform.

Once the preforms are finished, they are used to make composite products, particularly by resin transfer molding (RTM) or structural reaction injection molding (SRIM) processes. For each of the particular size and configuration of preform components or products, the application process of the robot R needs to be programmed. The movement of the chopper gun relative to the preform screen needs to be controlled in order to provide the requisite amount of chopped material and binder at the requisite position on the screen. In order to prevent the programming process of the robot being done manually on the screens in the molds and thus creating down time of the cell for that purpose, the robotic program is automatically generated offline by a robotic software program, such as ROBCAD. In this manner, using a computerized process, virtually the entire path and programming of the robot R for making the preform can be programmed in the laboratory or facility and then adjusted or fine tuned at the actual cell site in order to manufacture the requisite shape of the preform.

Due to robotics and programmable chopper guns, blanks of varying glass content and thickness can be manufactured to suit the component design requirements. The programs for robotic applicators are automatically generated based upon part geometry, equipment constraints, material constraints, and desired part characteristics. The programs are tested within the ROBCAD software to insure that all positions are executable by the robot and free of object collisions.

Previous methods require that the operator program the robot either in the teach mold on the machine, that is on the cell, or use an offline programming software. The present invention allows generation of a robotic program for material deposition with minimal operator intervention. This reduces robotic programming lead time and automates the robotic programming process.

The software produces the required spray-up routine for the moveable arm 62 and chopper gun 60 on the robot R. For the veil mat, the fiberglass material can be chopped or broken up into fine pieces, such as 9–10 mm in length. For the remainder of the preform material, the fiberglass can be broken or chopped into pieces, approximately 25–50 mm in length.

The material used for molding the structural composite components is typically a polyester, polyurethane material, or an epoxy. In the mold, the material is injected through the preform and completely around it forming the final product.

It is also possible in accordance with the present invention to provide a hybrid material for forming the preform. For example, fiberglass and carbon string materials can be broken or chopped up simultaneously or concurrently forming the spray-on material. Doffs or bobbins of each of these materials can be used, together with one or two chopping wheels or knives in the chopper gun or applicator 60.

During the consolidation process, the upper mold sections or portions 22 and 32 of molds 20 and 30, respectively, are closed onto the lower molding tools or portions 24 and 34, respectively. Due to the consistent air flow through the deposition screens in the molds, higher velocity air flows are created when the two mold portions are being closed for consolidation of the preform. High velocity air flow adjacent the edges of the part can cause the deposit material to move from its original location, however, creating gaps in the sprayed materials or uneven edges.

Figure 4:
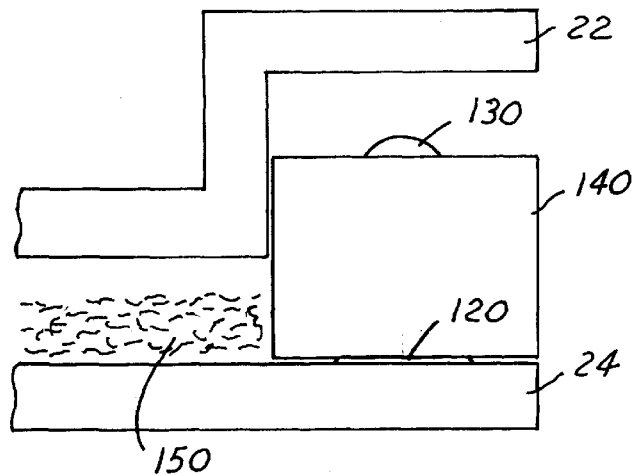
FIG. 4 is a partial cross-sectional diagram illustrating the mold for consolidating the preform in an open position.
Figure 5:
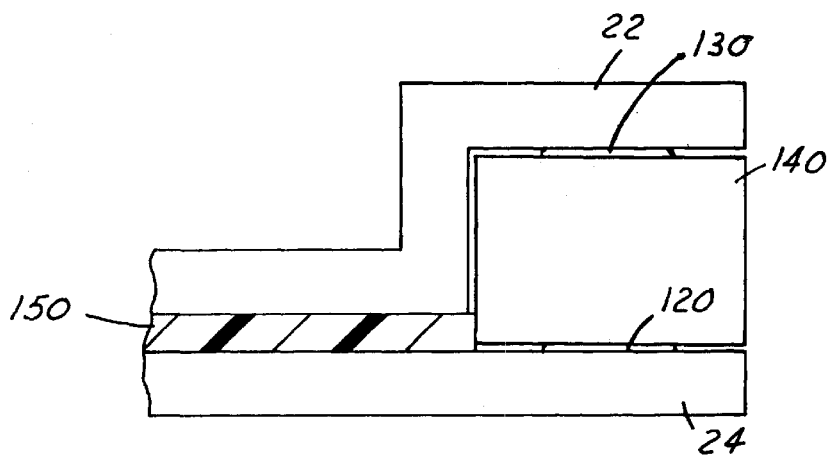
FIG. 5 illustrates the mold as shown in FIG. 4, but in a closed position.

In order to prevent the high velocity air flow from disturbing the material at the edges of the formed preform, seals 120 and 130 are provided, as shown in FIGS. 4 and 5.

Seal 120 is provided between the net-edge block 140 and the lower mold portion 24, 34. The second seal 130 is provided between the net-edge block 140 and the upper mold portion 22, 32. The net-edge blocks 140 are provided around the outer perimeter of the preform 150 in order to contain the sprayed materials and provide a net edge which does not have to be cut or framed afterwards. The blocks 140 are provided in the requisite shaper to form the perimeter of the preform and are secured to the molds with screws, bolts, or other fastener members.

The seals 120 and 130, which preferably are made from an elastomeric material, prevent high velocity air from entering into the internal portion of the mold (mold cavity) when the two mold portions are being closed. Seal 120 prevents high velocity air flow from entering the mold cavity and disturbing the preform between the net-edge block 140 and the lower mold portion, while the seal 130 is provided to prevent high velocity air flow from entering into the mold cavity between the net-edge block and the upper mold portion.

While the invention has been described in connection with one or more embodiments, it is to be understood that the specific mechanisms and techniques which have been described are merely illustrative of the principles of the invention. Numerous modifications may be made to the methods and apparatus described without departing from the spirit and scope of the invention as defined by the appended claims.

What is claimed is:

1. A system for the manufacture of reinforcing preforms for structural composite molding, comprising:

at least one mold for making a preform, said mold comprising a first mold member and a second mold member;

an air supply system for supplying air to said mold;

at least one robotic member for supplying chopped reinforcing materials to said at least one mold;

a material supply system for providing string reinforcing materials to said at least one robotic member;

a plurality of net-edge block members positioned on said first mold member and providing a peripheral edge form for the preform;

a first air sealing member positioned between said net-edge block members and said first mold member; and a second air sealing member positioned between said net-edge block members and said second mold member.

2. The system as recited in claim 1 further comprising a second mold for making a preform and a second air supply system for supplying air to said second mold, and wherein said at least one robotic member supplies chopped reinforcing materials to both of said at least one mold and said second mold.

3. The system as recited in claim 2 further comprising a second plurality of net-edge block members positioned in said second mold and providing a peripheral edge form for a second preform, and a second pair of air sealing members providing air seals between said second plurality of net-edge block members and said second mold.

4. The system as recited in claim 2 wherein said first and second air sealing members are each made from an elastomeric material.

* * * * *